United States Patent
Linke et al.

(10) Patent No.: US 9,542,634 B2
(45) Date of Patent: Jan. 10, 2017

(54) METHOD FOR THE PRODUCTION OF A PORTABLE DATA SUPPORT

(75) Inventors: Andreas Linke, Dietramszell (DE); Thomas Tarantino, Laufen (DE); Ando Welling, Isen (DE); Johann Angerer, Bad Wiessee (DE); Kolja Vogel, München (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 1469 days.

(21) Appl. No.: 11/659,953

(22) PCT Filed: Aug. 11, 2005

(86) PCT No.: PCT/EP2005/008756
§ 371 (c)(1),
(2), (4) Date: Aug. 14, 2007

(87) PCT Pub. No.: WO2006/018230
PCT Pub. Date: Feb. 23, 2006

(65) Prior Publication Data
US 2007/0289126 A1     Dec. 20, 2007

(30) Foreign Application Priority Data

Aug. 12, 2004 (DE) .......................... 10 2004 039 201

(51) Int. Cl.
*G06K 21/06* (2006.01)
*G06K 19/077* (2006.01)

(52) U.S. Cl.
CPC ... *G06K 19/07732* (2013.01); *G06K 19/07739* (2013.01); *G06K 19/07743* (2013.01); *Y10T 29/49117* (2015.01)

(58) Field of Classification Search
None
See application file for complete search history.

(56) References Cited

U.S. PATENT DOCUMENTS 6,554,193 B1 *  4/2003  Fehrman et al. ............. 235/488
6,588,673 B1 *  7/2003  Chan et al. ................... 235/492
(Continued)

FOREIGN PATENT DOCUMENTS

DE     102 33 428 A1     11/2003
DE     103 44 049 A1      6/2004
(Continued)

*Primary Examiner* — Christopher Stanford
*Assistant Examiner* — Tae Kim
(74) *Attorney, Agent, or Firm* — Workman Nydegger

(57) ABSTRACT

A method for the production of a portable data carrier having an integrated circuit and a contact field galvanically connected to the integrated circuit. In an area defined by the contact field, the portable data carrier is shaped and the contact field is embodied such that a direct contacting of the contact field by a contacting component embodied in accordance with the USB standard is possible. The portable data carrier in its final form is produced in chip card technology. Alternatively, an element is produced in chip card technology, which element features the integrated circuit and the contact filed, and data and/or program code required for the operation of the portable data carrier are loaded into the integrated circuit. Subsequently the element is permanently connected to a carrier.

14 Claims, 3 Drawing Sheets

(56) References Cited

U.S. PATENT DOCUMENTS

| | | |
|---|---|---|
| 6,694,399 B1 | 2/2004 | Leydier et al. |
| 6,840,454 B1 | 1/2005 | Rhelimi |
| 2004/0128371 A1* | 7/2004 | Park et al. ............ 709/221 |
| 2004/0259423 A1* | 12/2004 | Elbaz et al. ............ 439/660 |

FOREIGN PATENT DOCUMENTS

| | | |
|---|---|---|
| DE | 195 00 925 A1 | 7/2006 |
| EP | 0 275 510 | 7/1988 |
| EP | 1 429 283 A2 | 6/2004 |
| JP | 63-182795 | 7/1988 |
| JP | 2002-525720 | 8/2002 |
| JP | 2003-317066 | 11/2003 |
| JP | 2004-133843 | 4/2004 |
| WO | WO 03/027946 A1 | 4/2003 |

\* cited by examiner

METHOD FOR THE PRODUCTION OF A PORTABLE DATA SUPPORT

BACKGROUND OF THE INVENTION

A. Field

The invention relates to a method for producing a portable data carrier. Furthermore the invention relates to a semifinished product for the production of a portable data carrier and a portable data carrier.

B. Related Art

In many applications of portable data carriers, these data carriers carry out a communication with an electric device. In view of the strong increase of electric devices having a USB interface also the number of portable data carriers with USB interface is increasing. USB stands for universal serial bus and refers to a communication standard with which comparatively high data transfer rates can be achieved. For the establishment of a data connection between the portable data carrier and the electric device the portable data carrier is plugged into a USB jack of the electric device. In order to permit this, an area of the portable data carrier is embodied as a USB plug whose geometry and contact assignment are matched to the USB jack. A portable data carrier thus embodied is typically also referred to as USB token and can for example be used as a storage element or as a security tool.

USB tokens are as a rule produced by means of circuit boards which bear USB contacts on one side and have a memory chip on the other side. However, this type of production is relatively elaborate.

An alternative production method is known from WO 03/027946. There a method for the production of an electronic key is disclosed, which key has a module with an integrated circuit. The integrated circuit is connected to contact surfaces of the module which are embodied in such a way that they can be contacted directly by a USB jack. The module is produced in chip card technology. In order to achieve outer dimensions compatible to a USB jack the overall surface or parts of the module are provided with further material or inserted in an adapter.

It is the problem of the invention to embody a portable data carrier with as little effort and expenditure as possible in such a way that it can be contacted directly by a contacting element embodied in accordance with the USB standard.

BRIEF SUMMARY OF THE INVENTION

In the inventive method for the production of a portable data carrier having an integrated circuit and a contact field galvanically connected to the integrated circuit, the portable data carrier is shaped in such a way in the area of the contact field and the contact field is embodied in such a way that a direct contacting of the contact field by a contacting element embodied in accordance with the USB standard is possible. The portable data carrier is produced in its final form in chip card technology or an element is produced in chip card technology, which element features the integrated circuit and the contact field and data and/or program code required for the operation of the portable data carrier are loaded into the integrated circuit. Subsequently the element is permanently fixed to a carrier.

The inventive method has the advantage that the production can at least partially be carried out using production facilities for chip cards. A wide range of such facilities is available which are characterized by a high degree of automation. In particular, it is also possible with these facilities to load data and/or program code into the integrated circuit in a very efficient manner.

In a first embodiment the element is embodied as a chip card element having a card body in the shape of a flat piece. The card body is preferably embodied thinner than the portable data carrier, in particular with a thickness specified by the standard ISO 7810. In the card body a chip module including the integrated circuit and the contact field can be embedded. Before the establishment of the connection with the carrier, the chip card element can be at least temporarily integrated in a card with a larger main surface than the chip card element, in particular with a main surface in accordance with the standard ISO 7810. This has the advantage that the handling of the chip card element during production is simplified and existing chip card production facilities only have to be slightly modified.

In a second embodiment the element is embodied as a chip module.

The loading of the data and/or the program code into the integrated circuit is preferably carried out with the aid of the USB protocol which is provided for the communication of the portable data carrier anyway. In order to render the loading as simple as possible, the integrated circuit is adapted to carrying out the USB protocol preferably at an early stage, expediently directly at the beginning of the completion.

The carrier can have a larger main surface than the element and is in particular embodied as an injection-molded component which can be produced cost-effectively in a great variety of forms.

The element is preferably disposed in a recess or an at least partially framed section of the carrier. Thereby a precise positioning is facilitated and the element is stabilized in its desired position on the carrier. The element and the carrier are expediently shaped in such a manner that they can only be assembled in one single more defined way. For the establishment of a permanent connection the element can be connected to the carrier in a material locking manner. It is equally possible to connect the element to the carrier in a form locking or in a force locking manner. In this case, the element and the carrier can be manually assembled by the user of the portable data carrier. In the case that the final assembly is carried out by the user, also the preparations for shipping can be carried out with the aid of facilities for chip card production.

The invention furthermore relates to a semifinished product for the production of a portable data carrier having a contact field embodied in such a manner and being shaped in the area of the contact field in such a way that a direct contacting of the contact field by a contacting element embodied in accordance with the USB standard is possible. The inventive semifinished product has an integrated circuit and the contact field which is galvanically connected to the integrated circuit and is embodied as an element produced in chip card technology. It is an advantage of the inventive semifinished product that in addition to the memory content produced during its production, data and/or program code required for the operation of the portable data carrier are stored in the integrated circuit.

The inventive portable data carrier has an integrated circuit and a contact field galvanically connected to the integrated circuit. In the area of the contact field the data carrier is shaped in such a way and the contact field is embodied in such a way that a direct contacting of the contact field by a contacting element embodied in accordance with the USB standard is possible. It is an advantage of the inventive portable data carrier that in its final geometry it is produced in chip card technology or has an element produced in chip card technology with the integrated circuit and the contact field, which element is disposed in a recess or an at least partially framed section on a main surface of a carrier and is permanently connected to the carrier.

DESCRIPTION OF THE DRAWINGS

The invention will hereinafter be explained with reference to the embodiments shown in the drawing.

The figures are described as follows.

DETAILED DESCRIPTION

Figure 1:
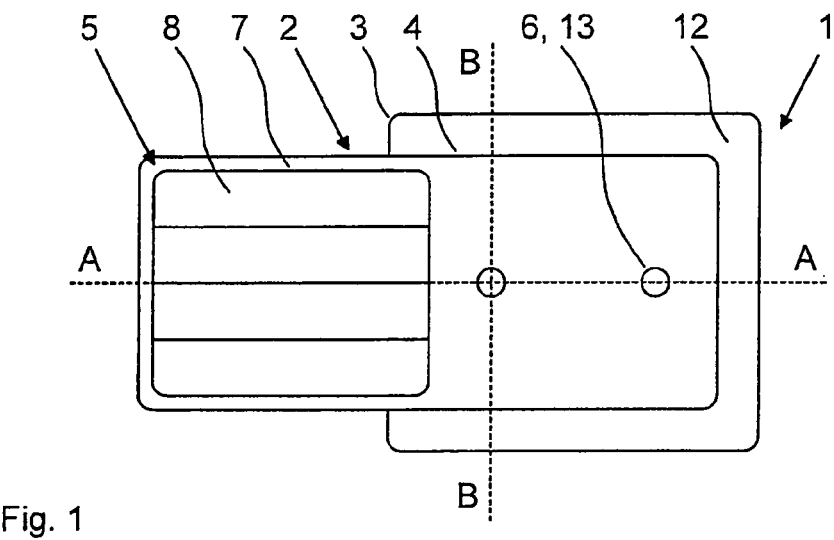
FIG. 1 a first embodiment of an inventively embodied portable data carrier in a schematic plan view, FIG. 2 a section through the embodiment of the portable data carrier represented in FIG. 1 along the cutting line AA shown in FIG. 1, FIG. 3 a section through the embodiment of the portable data carrier represented in FIG. 1 along the cutting line BB shown in FIG. 1, FIG. 4 a snapshot during the production of the first embodiment of the portable data carrier in the form of a schematic cross section, FIG. 5 an embodiment of the chip card element before connection to the carrier in a schematic plan view, FIG. 6 a second embodiment of the portable data carrier in a schematic plan view, FIG. 7 a snapshot during the production of the second embodiment of the portable data carrier in a representation corresponding to FIG. 4 and FIG. 8 a snapshot during the production of a third embodiment of the portable data carrier in a representation corresponding to FIG. 4.
Figure 2:
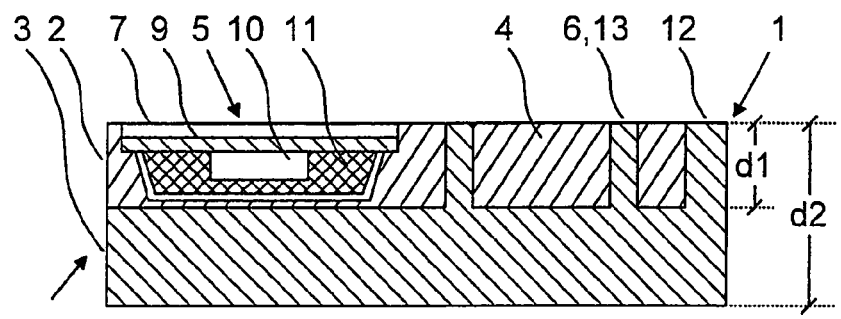
Figure 3:
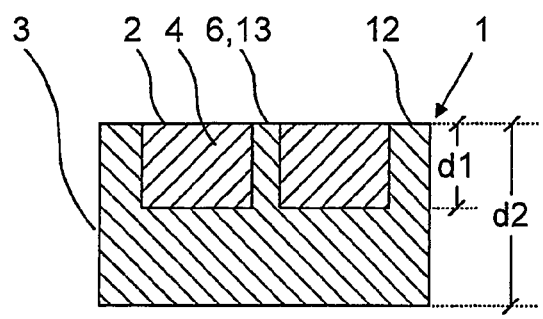

FIG. 1 shows a first embodiment of an inventively embodied portable data carrier 1 in a schematic plan view. A section through the portable data carrier 1 along the cutting line AA shown in FIG. 1 is represented in FIG. 2. A further section along the cutting line BB is shown in FIG. 3. For clarity's sake the sections are drawn in a greatly different scale.

The portable data carrier 1 is embodied as a USB token which can for example be plugged into a USB jack of a computer or other device. Data transfer in accordance with the USB standard enables significantly higher transfer rates than for example the sequential data transfer of a chip card in accordance with the T=0 or the T=1 protocol.

The portable data carrier 1 has a chip card element 2 and a carrier 3. The chip card element 2 consists of a card body 4 and a chip module 5 which is embedded in the card body 4. The card body 4 is for example embodied as an injection-molded component or laminated foil stack and is provided with two through bores 6 outside the area in which the chip module 5 is disposed. The chip module 5 has a contact field 7 with four contact surfaces 8 which are arranged on a substrate 9. The embodiment of the contact field 7 is compatible to the USB standard. By exception of the embodiment of the contact field 7 the chip module 5 used within the framework of the invention is of a constructional type which is customary for installation in chip cards. On the side of the substrate 9 opposite the contact field 7 an integrated circuit 10 is disposed and protected from external influences by a cast block 11. The integrated circuit 10 is not shown in section and is connected to the contact field 7 by means of electric connections which are not shown in the drawing.

The carrier 3 is embodied partially congruently to the chip card element 2 and partially laterally extends beyond the chip card element 2. In the projecting areas the carrier 3 has an elevated edge 12 which surrounds the chip card element 2 on three sides and which is flush with the surface of the chip card element 2. On its main surface facing the chip card element 2 the carrier 3 has two pins 13 oriented vertically in relation to its surface, which pins engage with the through bores 6 of the chip card element 2 and thereby, supported by the edge 12 of the carrier 3, establish a firm and permanent mechanical connection between the chip card element 2 and the carrier 3. In order to prevent a detachment of the chip card element 2 from the carrier 3 the pins 13 are pressed into the through bores 6 with a radial overlap.

As an alternative to the through bores 6 and the pins 13 also undercuts on the inner side of the edge 12 of the carrier 3 and on the corresponding front surfaces of the chip card element 2 can be provided, by means of which a form-locking engagement between the chip card element 2 and the carrier 3 can be established. The undercuts can for example be produced by means of a conical embodiment of the above-mentioned surfaces. In an alternative embodiment of the pin solution, the carrier 3 consists of several partial layers forming interlocking pins 13 which are firmly pressed into the through bores 6 through the pressing together when the connection with the chip card element 2 is established. In a further variant the carrier 3 consists of two half-shells to be assembled which entirely enclose the chip card element 2 as partial shells.

The chip card element 2 has a uniform thickness d1 which amounts to 0.8 mm following the standard ISO 7810 for chip cards. In the area of its edge 12 the carrier 3 has a thickness which corresponds to the thickness d2 of the portable data carrier 1. With a view to a compatibility with the USB standard a value of 2.2 mm is chosen for the thickness d2. In the shown embodiment the portable data carrier 1 is embodied uniformly in regard of the thickness d2, i.e. it has the same value concerning the thickness d2 all over its complete surface. Especially on the bottom side, as indicated in FIG. 4 by the recess 20, adapted to individual interface definitions, recesses or projections can be provided which support the connection of the data carrier 1 with a corresponding interface, e.g. a USB interface.

Figure 4:
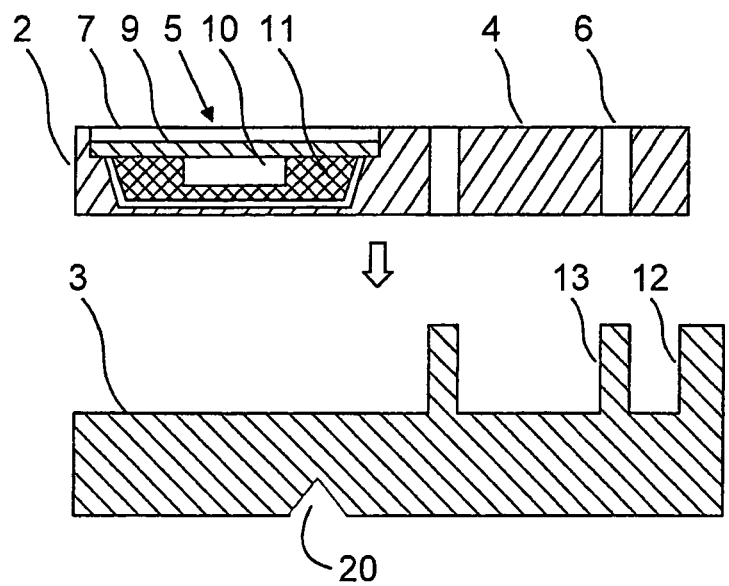
Figure 5:
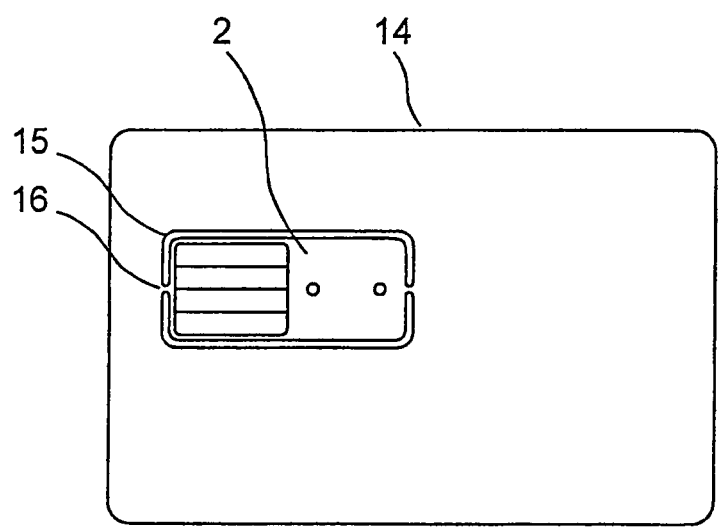

The production of the first embodiment of the portable data carrier 1 is explained by means of the FIGS. 4 and 5.

FIG. 4 shows a snapshot during the production of the first embodiment of the portable data carrier 1 in the form of a schematic sectional view. The chip card element 2 and the carrier 3 are shown shortly before their assembly to form the portable data carrier 1. For the production of the portable data carrier 1 first the chip card element 2 and the carrier 3 are produced independently and are then assembled in the manner shown in FIG. 4. The carrier 3 is preferably produced as an injection-molded component. The production of the chip card element 2 is explained by means of FIG. 5.

The chip card element 2 and the carrier 3 are approached to each other in such a manner that the chip card element 2 is disposed inside the edge 12 of the carrier 3 and the through bores 6 of the chip card element 2 become congruent with the pins 13 of the carrier 3. The approach is continued after the insertion of the pins 13 into the through bores 6 until the chip card element 2 and the carrier 3 touch each other all over their complete surface. Therein the chip card element 2 and the carrier 3 are expediently shaped in such a way that only one single assembly position is possible. For the establishment of a firm connection between the chip card element 2 and the carrier 3 additionally or alternatively to the fixation by pins for example a gluing together or bonding can be carried out. In all variants the connection between the chip card element 2 and the carrier 3 can be carried out fully automatically by machine. Alternatively, at least concerning the purely mechanical types of connection, there is furthermore the possibility to have the user of the portable data carrier 1 establish the connection before the first use.

As will be explained in more detail in the following, the liberty with a view to the type of assembly is made possible by the fact that the portable data carrier 1 does not need to be completed in order to be loaded with program code and data required for its use. Rather, this loading process is carried out completely or partly with the chip card element 2 before it is connected to the carrier 3.

FIG. 5 shows an embodiment of the chip card element 2 before its connection with the carrier 3 in a schematic plan view. The chip card element 2 is embodied as a component of a standard card 14 whose shaping corresponds to the standard ISO 7810. It is thus possible to produce the chip card element 2 with an existing production facility for standard cards 14 which needs to be adapted only marginally for this purpose. In order to enable the easy removal of the chip card element 2 from the standard card 14 after its production, the chip card element 2 is separated from the standard card 14 in the area of its outer contour by punched-out portions 15, wherein only narrow bars 16 remain between the chip card element 2 and the standard card 14 in order to prevent the chip card element 2 from falling off. The bars 16 can be cut off by machine for the removal of the chip card element 2, subsequently the chip card element 2 can be connected to the carrier 3 by machine. It is equally possible to send the standard card 14 with the chip card element 2 to the intended user, who then breaks the chip card element 2 out of the standard card 14 manually and places it on the carrier 3.

In both cases the integrated circuit 10 contained in the chip card element 2 is already loaded with data and program codes required for the operation of the portable data carrier 1 at the time of removal of the chip card element 2 from the standard card 14. The loading of the integrated circuit 10 is expediently carried out at a time when the chip card element 2 is still part of the standard card 14 and can thus be handled well. In detail, an electric check of the chip module 5, the completion of the operating system, an initialization and, if required, a personalization are carried out.

At a preferably early stage, for example directly at the start of the completion, the USB functionality is established in the integrated circuit 10, so that the further completion and, if required, the personalization can be carried out making use of the USB protocol. This has the advantage that then, in comparison to the ISO 7816 protocol, greater data amounts can be transferred and the loading procedure can be carried out correspondingly more quickly. In addition, the USB protocol allows longer connection lines, so that the loading procedure can be carried out directly between the chip card element 2 and a computer used for the completion.

In the case that the operating system of the integrated circuit 10 is capable of the USB protocol and also the completion software used in the computer is capable of the USB protocol, i.e. the corresponding drivers exist, in order to carry out the loading procedure the contact field 7 of the chip card element 2, which contact field is embodied in accordance with the USB protocol, is contacted with a matching contact button and subsequently a data transfer between the computer used and the integrated circuit 10 of the chip card element 2 is carried out in accordance with the USB protocol.

For the data transfer there is the possibility in a first variant to use a passive contact button and to carry out the USB data transfer directly between the computer and the integrated circuit 10 of the chip card element 2. However, in every new contacting of a chip card element 2 by the contact button the overhead of the USB protocol has to be worked through, so that relatively much time is required per chip card element 2 for the complete transfer of the data and of the program code from the computer to the integrated circuit 10.

In a second variant again a passive contact button is used, however an additional device is interposed between the contact button and the computer, which always simulates the same communication partner vis-à-vis the computer also after each new contacting of a chip card element 2. Thereby the overhead of the USB protocol can be reduced and a shorter loading time for the data and the program code can be achieved.

In a third variant an active contact button having a microchip is used. The active contact button implements parts of a low layer of the USB protocol so that no overhead is necessary and very short loading times can be achieved.

Figure 6:
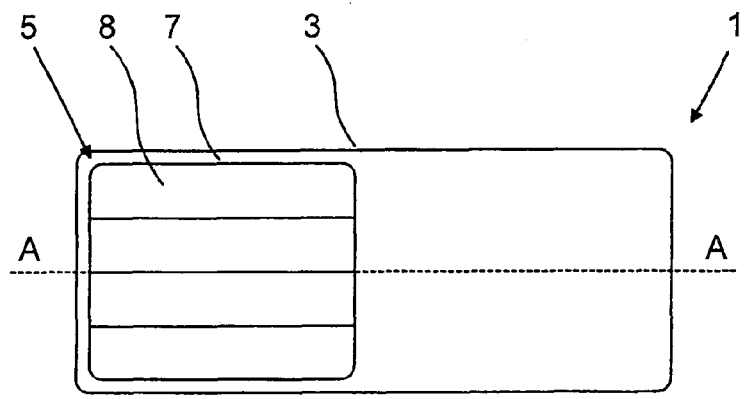

FIG. 6 shows a second embodiment of the portable data carrier 1 in a schematic plan view. In contrast to the first embodiment, the chip module 5 in the second embodiment is not embedded in a chip card element 2, but directly in the carrier 3. Consequently, the edge 12 and the pins 13 of the carrier 3 can be omitted, which serve for the fixation of the chip card element 2 in the first embodiment. Thus the second embodiment of the portable data carrier features a carrier 3 shaped corresponding to the chip card element 2 provided in the first embodiment, however the thickness of which carrier differs from the thickness d1 of the chip card element 2. This difference in thickness can be noted from FIG. 7. The chip module 5 is embodied in such a way that it can be handled well.

Figure 7:
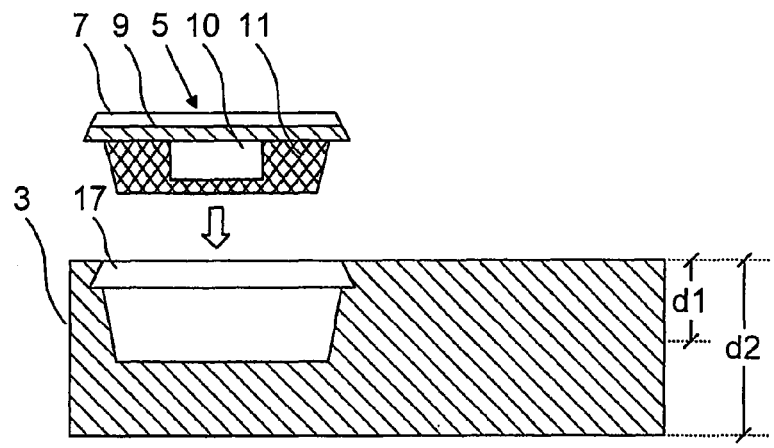

FIG. 7 shows a snapshot during the production of the second embodiment of the portable data carrier 1 in a representation corresponding to FIG. 4. By the exception of the area of a two-step recess 17 which is provided for an intake of the chip module 5, the carrier 3 uniformly has the thickness d2 of the portable data carrier 1. The recess 17 is partially conically enlarged toward the inside of the carrier 3, so that an undercut is formed. In a corresponding manner the chip module 5 is partially embodied conically. In the representation of FIG. 7 the chip module 5 is disposed close to the recess 17 of the carrier 3 and for the production of the portable data carrier 1 the chip module is pressed by machine in the manufacturer's works or manually by the user of the portable data carrier 1 into the recess 17. Due to the matching shaping of the chip module 5 and the recess 17 thus a form-locking fixation of the chip module 5 in the recess 17 of the carrier 3 is established. In the case of machine production the connection between the chip module 5 and the carrier 3 can for example also be established through gluing or bonding.

Also in the second embodiment the chip module 5 of the portable data carrier 1 is produced by means of the technology known for chip modules 5 for chip cards. Since the chip module 5 is not integrated in the card body 4 of the chip card element 2, but directly in the carrier 3, the thickness of the chip module 5 is however not limited to the value of approximately 0.6 mm, which is the admissible maximum in the case of an integration in the card body 4. In order to facilitate the handling, a plurality of chip modules 5 can be strung together in a band.

The loading of program code and data into the integrated circuit 10 of the chip module 5 in the second embodiment of the portable data carrier 1 is preferably carried out before the integration of the chip module 5 into the carrier 3. The procedure can be carried out analogously to the description concerning the chip card element 2 of the first embodiment of the portable data carrier 1. Also with regard to the further processing, including the shipping to the user, the procedure described for the chip card element 2 is used in an analogous manner.

Figure 8:
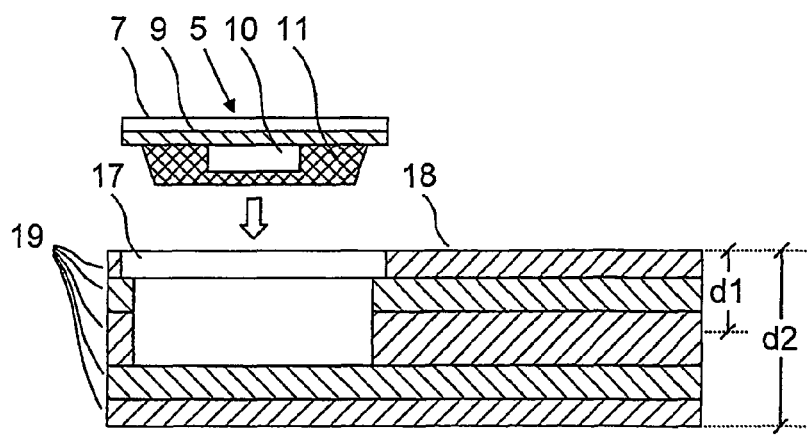

FIG. 8 shows a snapshot during the production of a third embodiment of the portable data carrier 1 in a representation corresponding to FIG. 4. The third embodiment of the portable data carrier 1 corresponds to the second embodiment shown in FIG. 6 as regards its outer appearance, however differs therefrom with regard to its structure and the production method used. The production method is characterized by the fact that the portable data carrier 1 is produced in its entirety in chip card technology, however diverts from the specifications of the standard ISO 7810 as regards its dimensions. The representation in FIG. 8 refers to a production step in which a chip module 5 is integrated in a receiving body 18 similar to a card. With a view to its dimensions the chip module 5 can be embodied for a chip card in accordance with the standard ISO 7810 or have a greater thickness. In any case the chip module 5 features a USB compatible contact field 7. The receiving body 18 is made of a stack of plastic foils 19 which are firmly connected to each other by lamination. In comparison to the production of chip cards in accordance with the standard ISO 7810 the foil stack contains at least one thicker plastic foil 19 and/or at least one additional plastic foil 19.

In a location intended for the integration of the chip module 5 the receiving body 18 features the recess 17. After the insertion of the chip module 5 in the recess 17 the chip module is glued or bonded to the receiving body 18. A manual insertion by the user of the portable data carrier 1 is not provided therein. It is thus possible in principle to load the integrated circuit 10 with data and program code after the integration of the chip module 5 in the receiving body 18. In view of the comparatively elaborate machine handling of the portable data carrier 1 the loading procedure is preferably carried out with the chip module 5 though, which can again be incorporated in a band for the purpose of easier handling. The loading process is carried out analogously to the description of the first and the second embodiment of the portable data carrier 1.

The basic concept of providing for an inexpensive production of tokens by constructing the token using primarily one element which is produced in chip card technology allows further modifications not explained in greater detail which still lie within the framework of the inventive solution. For example, a chip card module 2 can readily have more than only one integrated circuit. The several circuits can furthermore in particular be galvanically connected to each other. Of course the described solution is furthermore not limited to USB tokens. Rather, it is always expedient when an interface typically used in the chip card sector is intended for use in a portable data carrier which does not have standard dimensions.

List of Reference Numbers

| | |
|---|---|
| 1 | portable data carrier |
| 2 | chip card element |
| 3 | carrier |

-continued

List of Reference Numbers

| | |
|---|---|
| 4 | card body |
| 5 | chip module |
| 6 | through bore |
| 7 | contact field |
| 8 | contact surface |
| 9 | substrate |
| 10 | integrated circuit |
| 11 | cast block |
| 12 | edge |
| 13 | pin |
| 14 | standard card |
| 15 | punched-out portion |
| 16 | bar |
| 17 | recess |
| 18 | intake body |
| 19 | plastic foil |
| 20 | groove |

The invention claimed is:

1. Method for production of a portable data carrier, the data carrier comprising a carrier and an element with an integrated circuit and a contact field galvanically connected to the integrated circuit,
   wherein the portable data carrier is shaped in an area defined by the contact field and the contact field is embodied such that a direct contacting of the contact field by a contacting component embodied in accordance with the USB standard is enabled, and
   wherein the element of the portable data carrier featuring the integrated circuit and the contact field is produced in chip card technology and the element is embodied as a chip card element having a card body in a shape of a flat piece, and
   wherein either or both data and program code required to operate the portable data carrier is loaded into the integrated circuit, and
   wherein the carrier is embodied partially congruent to the element and partially laterally extends beyond the element, the partially lateral extension forming an at least partially framed section on a main surface of the carrier, and
   wherein the card body of the element is placed in the at least partially framed section on the main surface of the carrier, and
   wherein the card body of the element is subsequently permanently connected to the carrier.

2. Method according to claim 1, wherein the card body is embodied thinner than the portable data carrier.

3. Method according to claim 1, wherein in the card body a chip module is embedded, which features the integrated circuit and the contact field.

4. Method according to claim 1, wherein before the establishment of the connection to the carrier the chip card element is at least temporarily integrated in a card with a larger main surface than the chip card element.

5. Method according to claim 1, wherein the element is embodied as a chip module.

6. Method according to claim 1, wherein the loading of either or both the data and the program code into the integrated circuit is carried out with the aid of the USB protocol.

7. Method according to claim 1, wherein the integrated circuit is able to carry out a data transfer in accordance with the USB protocol already before the completion of its operating system.

8. Method according to claim 1, wherein the carrier has a larger main surface than the element.

9. Method according to claim 1, wherein the carrier is embodied as an injection-molded component.

10. Method according to claim 1, wherein the element is disposed in a recess of the carrier.

11. Method according to claim 1, wherein the element is connected to the carrier in a material locking manner.

12. Method according to claim 1, wherein the element is connected to the carrier in either or both a form locking and force locking manner.

13. Method according to claim 12, wherein the element and the carrier are manually assembled by the user of the portable data carrier.

14. Portable data carrier comprising:
- an integrated circuit and a contact field galvanically connected to the integrated circuit,
- wherein the portable data carrier is shaped in an area defined by the contact field and the contact field is embodied such that a direct contacting of the contacting field by a contacting component embodied in accordance with the USB standard is possible,
- wherein the portable data carrier comprises a carrier and an element produced in chip card technology with the integrated circuit and the contact field,
- wherein the element is embodied as a chip card element having a card body in a shape of a flat piece, and
- wherein the carrier is embodied partially congruent to the element and partially laterally extends beyond the element, the partially lateral extension forming an at least partially framed section on a main surface of the carrier, and
- wherein the card body of the element is disposed in a recess or the at least partially framed section on a main surface of the carrier and the card body of the element is subsequently permanently connected to the carrier.

* * * * *